Figure 1:
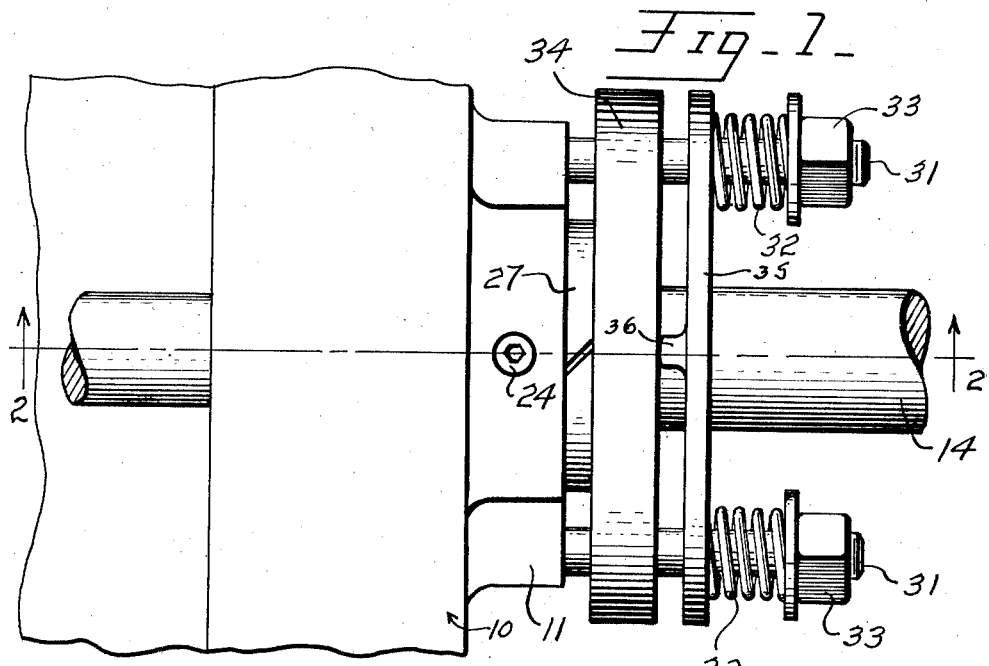

June 5, 1951 — G. W. REED — 2,555,932
ROTARY SEAL
Filed Oct. 4, 1946

Inventor
GEORGE W. REED
By Kimmel & Crowell
Attorneys

Patented June 5, 1951

2,555,932

UNITED STATES PATENT OFFICE 2,555,932

ROTARY SEAL

George W. Reed, Onalaska, Wis., assignor to Bump Pump Company, La Crosse, Wis., a corporation of Wisconsin Application October 4, 1946, Serial No. 701,165

1 Claim. (Cl. 286—11.14)

This invention relates to a rotary seal for shafts.

An object of this invention is to provide a seal for a rotary shaft which will eliminate the use of unsanitary packing mediums on pumps handling food products, such as syrups or the like.

Another object of this invention is to provide a rotary seal which will prevent a damping action usually encountered with internal springs when sealing highly viscous liquid.

A further object of this invention is to provide a rotary seal which is so constructed and arranged that coagulation, dehydration, or crystallization will have no effect on the springs.

A further object of this invention is to provide a rotary seal wherein the sealing surfaces may be cleansed of unsanitary, crystallized or coagulated materials by flushing the seal without removal or disturbance of the parts thereof.

With the above and other objects in view, my invention consists in the arrangement, combination and details of construction disclosed in the drawings and specification, and then more particularly pointed out in the appended claim.

Figure 2:
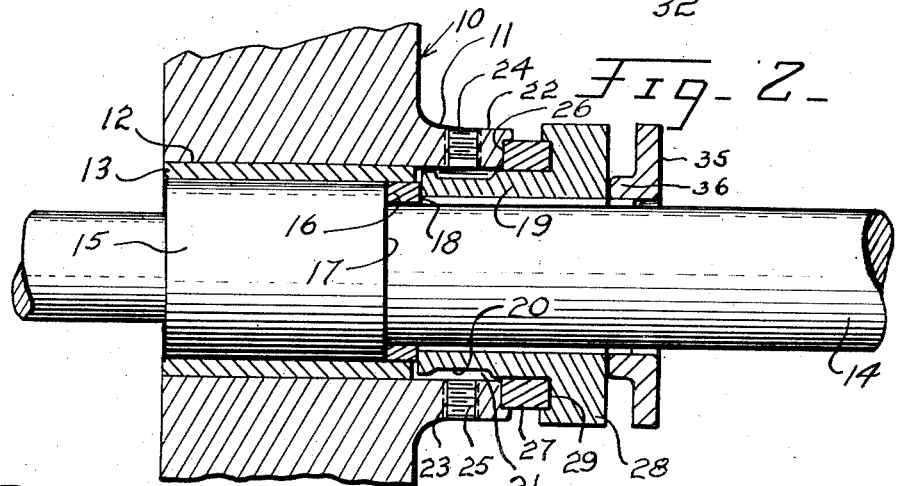
Figure 3:
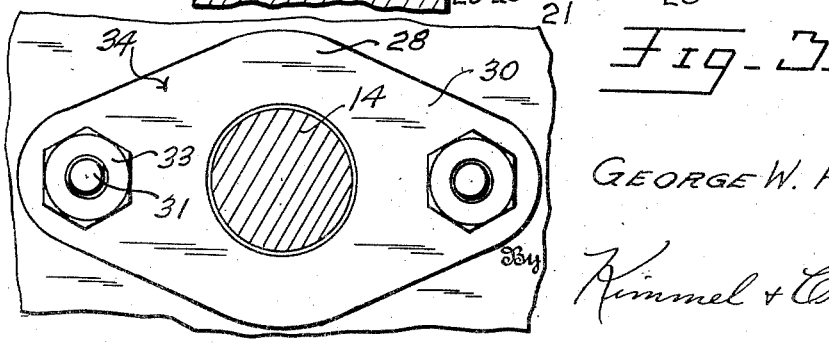

In the drawings,

Figure 1 is a detail side elevation of a rotary seal constructed according to an embodiment of this invention, Figure 2 is a sectional view taken on the line 2—2 of Figure 1, Figure 3 is a fragmentary front elevation of the device.

Referring to the drawing, the numeral 10 designates generally a bearing housing which also includes a cylindrical boss 11 extending outwardly from a bore 12 which is formed through the housing 10. A bearing sleeve 13 is disposed in the bore 12 and is of a length shorter than the length of the bore 12, as shown in Figure 2. A shaft 14 is adapted to be journaled through the bearing sleeve 13 and may be formed with an enlarged diameter shaft portion 15 which engages within the sleeve 13 and is of a length less than the length of the sleeve 13.

A ring 16 is fixedly mounted on the shaft 14 bearing against the shoulder 17 formed by the enlarged shaft portion 15. The ring 16 may be pressed or otherwise firmly secured to the shaft 14 and is preferably highly tempered so as to provide a hardened outer edge portion 18. A cylindrical member 19 is disposed loosely about the shaft 14 and is of a diameter slightly less than the inner diameter of the bore 12.

The cylindrical member 19 at its inner end bears against the hardened outer surface 18 of the ring 16 and the cylindrical member 19 is formed outwardly from the inner end thereof with an annular groove 20. The groove 20 with the space between the periphery of the cylindrical member and the inner surface of the bore 12 forms a chamber 21 within which a lubricant or cleansing agent may be mounted.

The boss or bushing 11 is formed with a pair of diametrically opposed threaded openings 22 and 23 within which plugs 24 and 25 are adapted to be threaded. The outer end of the boss 11 is formed with an annular recess 26 within which the inner end of an annular sealing ring 27 is adapted to engage. The cylindrical member 19 at its outer end is formed with a flange 28 having an annular groove 29 therein within which the outer end of the sealing ring 27 is adapted to seat.

The flange 28 is also formed with a pair of oppositely extending ears 30 through which bolts 31 threaded into and extending from the housing 10 are adapted to engage. The bolts 31 have springs 32 disposed thereabout and spring tensioning nuts 33 are threaded on the bolts 31 so that the cap which is formed by the flange 28 and the ears 30, and generally designated as 34, will be resiliently tensioned to provide for the desired compression of the sealing member 27 and the desired frictional contact between the inner end of the cylindrical member 19 and the hardened ring 16.

The seal hereinbefore described has been designed for use on a pump to seal a rotary shaft in the pump and the pump is designed for use in pumping liquid food products, such as syrups or the like. With a seal as hereinbefore described, the rotary shaft 14 is thoroughly sealed with respect to the bearing and in the event there are any accumulations of foreign matter in the chamber 21, these accumulations can readily be removed by removing the screws 24 and 25 and forcing a cleansing liquid through the boss 11.

A pressure compensating plate 35 is mounted on the bolts 31 between the springs 32 and the cap 34, being provided with lugs 36 bearing against cap 34. By this construction the spring tension on cap 34 will be equalized even though the tension of one spring 32 be more or less than the other spring.

A seal of this kind will, therefore, provide a means whereby the foreign accumulations which may normally occur between the bearing and the shaft can be removed without taking the bearing apart. Furthermore, by providing the seal tensioning springs on the outside of the bearing, the springs will not become crystallized and these springs will not have any foreign matter adhering thereto as is the case where springs are mounted within the bearing or gland proper.

I do not mean to confine myself to the exact details of construction herein disclosed, but claim all variations falling within the purview of the appended claim.

What I claim is:

A bearing seal comprising a bearing housing having a bore therethrough, an annulus extending from said housing formed with an annular groove at its outer end, a shaft having an enlarged portion journalled in said housing extending through said bore, a ring fixedly secured to said shaft adjacent the outer surface of said enlarged portion, a cylindrical member loosely mounted on said shaft and extending into said annulus abutting said ring, a flange at the outer end of said cylindrical member having an annular groove in its inner end, a sealing ring seated between said first-mentioned and said second-mentioned annular groove, apertured ears on said flange, bolts extending from said housing through the apertures in said ears, a pressure compensating plate, lugs on said pressure compensating plate having apertures through which said bolts extend, springs on said bolts outwardly of said plate, and spring tensioning nuts threadedly engaging said bolts outwardly of said springs.

GEORGE W. REED.

REFERENCES CITED

The following references are of record in the file of this patent:

UNITED STATES PATENTS

| Number | Name | Date |
| --- | --- | --- |
| 660,399 | Shepard | Oct. 23, 1900 |
| 692,371 | Shaw | Feb. 4, 1902 |
| 673,932 | Baxter | June 19, 1928 |
| 1,808,353 | Jackson | June 2, 1931 |
| 1,617,500 | Scanes et al. | Feb. 15, 1937 |
| 2,158,832 | Podbielniak | May 16, 1939 |
| 2,469,065 | Coss | May 3, 1949 |

FOREIGN PATENTS

| Number | Country | Date |
| --- | --- | --- |
| 469,624 | Great Britain | of 1937 |